(12) United States Patent
Flann et al.

(10) Patent No.: US 7,079,943 B2
(45) Date of Patent: Jul. 18, 2006

(54) POINT-TO-POINT PATH PLANNING

(75) Inventors: Nicholas Simon Flann, Smithfield, UT (US); Shane Lynn Hansen, Smithfield, UT (US); Sarah Ann Gray, Providence, UT (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/042,636

(22) Filed: Jan. 25, 2005

(65) Prior Publication Data
US 2005/0192749 A1  Sep. 1, 2005

Related U.S. Application Data

(63) Continuation-in-part of application No. 10/680,307, filed on Oct. 7, 2003.

(51) Int. Cl.
*G01C 21/34* (2006.01)

(52) U.S. Cl. .................. 701/202; 701/25; 701/50; 701/209; 340/995.19; 172/4.5

(58) Field of Classification Search .............. 701/23, 701/25, 50, 200, 202, 209, 210; 340/995.19, 340/995.21; 172/4.5
See application file for complete search history.

(56) References Cited

U.S. PATENT DOCUMENTS

| | | | | |
|---|---|---|---|---|
| 5,486,822 A | 1/1996 | Tenmoku et al. | ...... | 340/995.22 |
| 5,528,888 A | 6/1996 | Miyamoto et al. | ........... | 56/10.2 |
| 5,648,901 A | 7/1997 | Gudat et al. | .......... | 364/424.027 |
| 5,684,476 A | 11/1997 | Anderson | ................... | 340/988 |
| 5,751,576 A | 5/1998 | Monson | ....................... | 700/83 |
| 5,793,934 A * | 8/1998 | Bauer | ........................ | 700/250 |
| 5,808,887 A * | 9/1998 | Dorst et al. | ................. | 345/474 |
| 5,870,564 A | 2/1999 | Jensen et al. | ............... | 709/241 |
| 5,955,973 A | 9/1999 | Anderson | ................... | 340/988 |
| 5,963,948 A | 10/1999 | Shilcrat | ...................... | 707/100 |
| 5,974,347 A | 10/1999 | Nelson | ......................... | 701/22 |
| 5,978,723 A | 11/1999 | Hale et al. | ..................... | 701/50 |
| 5,987,383 A * | 11/1999 | Keller et al. | ................ | 701/213 |
| 5,995,902 A | 11/1999 | Monson | ...................... | 701/202 |
| 6,085,130 A | 7/2000 | Brandt et al. | ................. | 701/26 |

(Continued)

FOREIGN PATENT DOCUMENTS

CA      2316774      11/2005

(Continued)

OTHER PUBLICATIONS

Gray, Sarah A., Planning and Replanning Events for Autonomous Orchard Tractors [online], 2001 [retrieved on Mar. 17, 2003]. Retrieved from the Internet:<URL: http://www.autonomoussolutions.com/press.html>.

(Continued)

*Primary Examiner*—Gary Chin

(57) ABSTRACT

A path planner and a method for determining a path for a vehicle comprises defining a starting point for the vehicle. A termination point is defined. An obstacle detector detects one or more obstacles in a work area between the starting point and the termination point. A boundary zone is defined about each corresponding obstacle. Candidate paths are identified between the starting point and the termination point. Each candidate path only intersects each boundary zone once for each corresponding obstacle. An economic cost is estimated for traversing each candidate path or a portion thereof between the starting point and the termination point. A preferential path is selected from the identified candidate paths based on the preferential path being associated with a lowest estimated economic cost.

29 Claims, 7 Drawing Sheets

U.S. PATENT DOCUMENTS

| | | | | |
|---|---|---|---|---|
| 6,088,644 | A | 7/2000 | Brandt et al. | 701/50 |
| 6,128,574 | A | 10/2000 | Diekhans | 701/209 |
| 6,141,614 | A | 10/2000 | Janzen et al. | 701/50 |
| 6,205,381 | B1 | 3/2001 | Motz et al. | 701/25 |
| 6,236,924 | B1 | 5/2001 | Motz et al. | 701/50 |
| 6,240,342 | B1 | 5/2001 | Fiegert et al. | 701/25 |
| 6,263,277 | B1 | 7/2001 | Tanimoto et al. | 701/209 |
| 6,336,051 | B1 | 1/2002 | Pangels et al. | 700/50 |
| 6,385,515 | B1 | 5/2002 | Dickson et al. | 701/28 |
| 6,445,983 | B1 | 9/2002 | Dickson et al. | 701/23 |
| 6,604,005 | B1* | 8/2003 | Dorst et al. | 700/56 |
| 6,907,336 | B1* | 6/2005 | Gray et al. | 701/50 |
| 2002/0040300 | A1 | 4/2002 | Ell | 705/1 |
| 2004/0068352 | A1 | 4/2004 | Anderson | 701/25 |
| 2005/0197757 | A1* | 9/2005 | Flann et al. | 701/50 |

FOREIGN PATENT DOCUMENTS

| | | |
|---|---|---|
| DE | 100 25 829 A1 | 12/2001 |

OTHER PUBLICATIONS

Gunderson, R. W., Torrie, M. W., Flann, N. S., Neale, C. M. U., Baker, D. J., GIS and the Computer-Controlled Farm [online], Jul. 2000. Retrieved from the Internet <URL: http://www.autonomoussolutions.com/press.html>.

Gray, Sarah, Hansen, Shane, and Flann, Nick, Dynamic Replanning for Multiple Unmanned Ground Vehicles Using the Jaugs Architecture [online], Aug. 17, 2002 [retrieved on Mar. 17, 2003]. Retrieved from the Internet <URL: http://www.autonomoussolutions.com/press.html.

Gray, Sarah, What is Path Planning [online], Aug. 17, 2002 [retrieved on Mar. 17, 2003]. Retrieved from the Internet <URL: http://www.autonomoussolutions.com/press.html.

"Computer Generation of Efficient Farm Field Courses", a thesis submitted to the Faculty of Graduate Studies and Research In Partial Fulfillment of the requirements for the degree of Electrical Engineering, Faculty of Engineering, University of Regina, By Gin Liu.

Kunnayut Eiamso-ard & Howie Choset, Entitled: Sensor Based Path Planning: Three-Dimensional Exploration And Coverage: Department of Mechanical Engineering Carnegie Mellon University Apr. 16, 1999.

Ruggero Frezza, Giorgio Picci, & Stefano Soatto, Entitled: A Lagrangian Formulation of Nonholonomic Path Following.

F. Glover, Tabu Search Part 1; ORSA Journal on Computing vol. 1 No. 3, pp. 190-206, 1989.

F. Glover, Tabu Search Part 2; ORSA Journal on Computing vol. 2 No. 1, pp. 4-32, 1990.

* cited by examiner

- - - - - - - = Candidate Paths (408)
─────── = Preferential Path (410)

POINT-TO-POINT PATH PLANNING

This application is a continuation-in-part of U.S. application Ser. No. 10/680,307, filed Oct. 7, 2003 and entitled, MODULAR PATH PLANNER.

FIELD OF THE INVENTION

This invention relates to a path planner and a method for planning a path from one point to another.

BACKGROUND OF THE INVENTION

A path planner may be used to determine one or more path plans for a vehicle to move over a work area from a first point to a second point, spaced apart from the first point. The work area may represent a field for growing a crop, a battlefield, or any other terrain. The work area may include one or more obstacles that may prevent, but need not prevent, a generally linear path from the first point to the second point. Accordingly, there is a need for a path planner and a method for applying path plan for the vehicle to navigate the work area.

SUMMARY OF THE INVENTION

A path planner and a method for determining a path for a vehicle comprises defining a starting point for the vehicle. A termination point is defined. An obstacle detector detects one or more obstacles in a work area between the starting point and the termination point. An obstacle clearance zone is defined about each corresponding obstacle. Candidate paths are identified between the starting point and the termination point. Each candidate path only intersects the obstacle clearance zone a maximum number of times (e.g., once) for each corresponding obstacle. An economic cost is estimated for traversing each candidate path or a portion thereof between the starting point and the termination point. A preferential path is selected from the identified candidate paths based on the preferential path being associated with a lowest estimated economic cost.

DESCRIPTION OF THE PREFERRED EMBODIMENT

Figure 1:
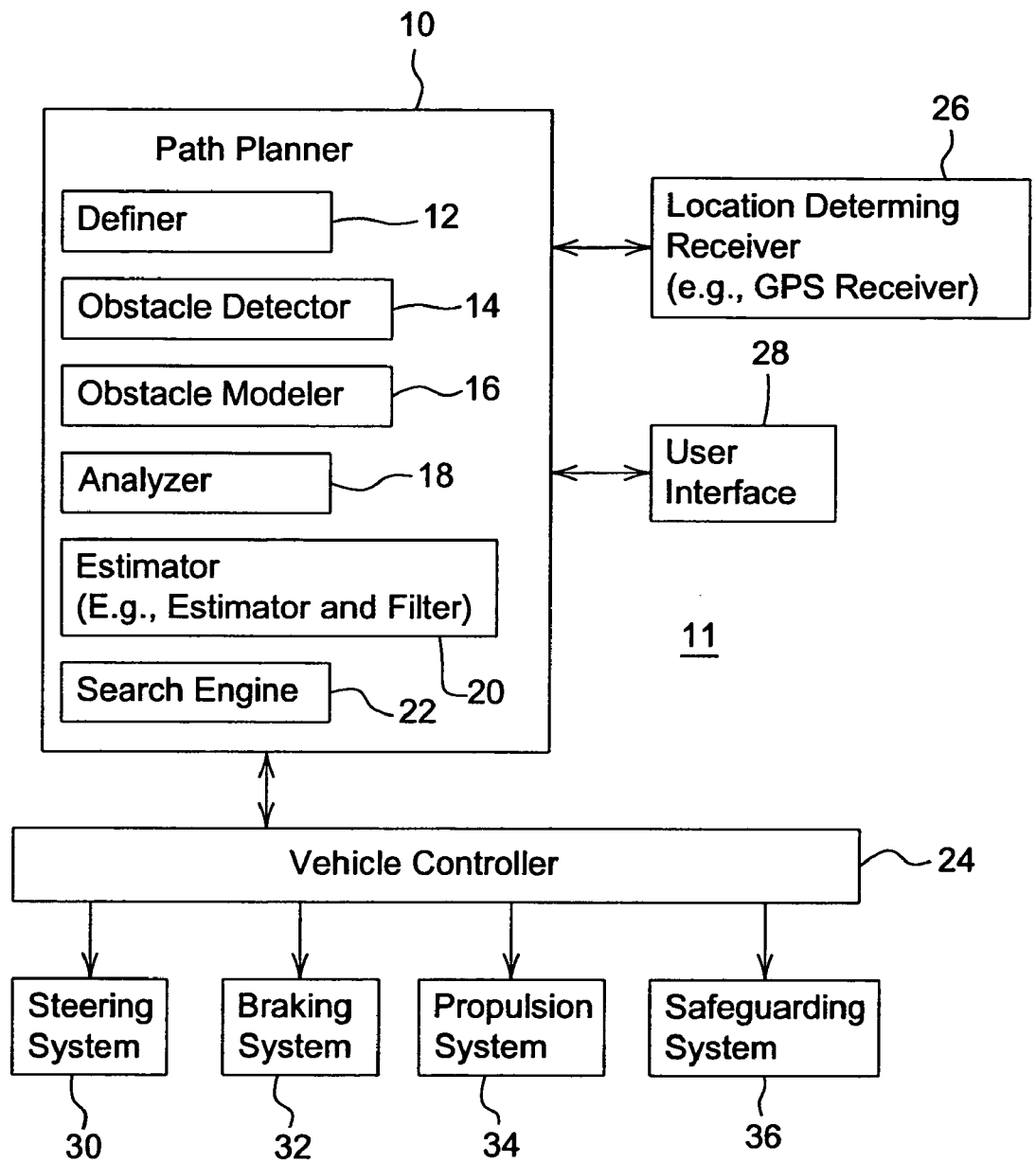
FIG. 1 is a block diagram of a path planner in accordance with the invention.

FIG. 1 is a block diagram of a path planning system 11. The path planning system 11 comprises a location-determining receiver 26 and a user interface 28 coupled to a path planner 10. The path planner 10 is coupled to a vehicular controller 24. In turn, the vehicular controller 24 is coupled to a steering system 30, a braking system 32 (if present), a propulsion system 34, and a safeguarding system 36.

The path planner 10 comprises a definer 12, an obstacle detector 14, an obstacle modeler 16, an analyzer 18, an estimator 20 and a search engine 22, which may be collectively referred to as the components of the path planner 10. The components (12, 14,16, 18, 20 and 22) of the path planner 10 may communicate with one another.

A location-determining receiver 26 may define a starting point for the vehicle, whereas the definer 12 defines a termination point for the vehicle. The starting point may comprise a starting point (e.g. two or three dimensional coordinates) and starting heading. The termination point may comprise a termination point (e.g., two or three dimensional coordinates) and a termination heading. Via the user interface 28, a user may enter a termination point (and termination heading) for the vehicle based on a user preference, a user decision or some other objective or target.

An obstacle detector 14 detects one or more obstacles in a work area between the starting point and the termination point. The obstacle detector may use one or more of the following components: an ultrasonic obstacle detector, a scanning laser, a range finder, a ladar (e.g., laser radar) system, a radar system, a machine vision system, a stereo vision system, or another obstacle detector. The obstacle detector 14 may use observed data from the safeguarding system 36 to detect the presence of an obstacle or previously collected data, or a survey of the work area that is inputted or entered into the path planner 10 via the user interface 28.

An obstacle modeler 16 defines an obstacle clearance zone about a physical boundary of each obstacle. For example, the obstacle clearance zone may be defined by extending a zone about the actual physical dimensions or physical boundary of the obstacle by one or more of the following: (a) modeling the perimeter or periphery of the obstacle clearance zone as an increase the two dimensional or three dimensional size of the boundary of the object by a certain factor or percentage (e.g., user definable percentage), and (b) modeling the perimeter or periphery of the obstacle clearance zone as an increase in the two dimensional or three dimensional size of the boundary of the object in proportion to the vehicular constraints of the vehicle. The vehicular constraints of the vehicle include the minimum turning radius of the vehicle, the vehicular width, the wheelbase, and the like. For example, the obstacle clearance zone may be selected to assure safe passage of the vehicle based on the precision and reliability of the location-determining receiver 26 for guidance and vehicular constraints (e.g., vehicular width and minimum turning radius) such that the vehicle safely passes by the obstruction or obstacle without colliding with it, striking it, scraping against it, or otherwise contacting it.

An analyzer 18 identifies candidate paths (or candidate path segments) between the starting point and the termination point. In one embodiment, each candidate path or candidate path segment only intersects each obstacle clearance zone a maximum number of time (e.g., once) for each corresponding obstacle. The actual maximum number of times for intersecting the obstacle clearance zone may depend on the physical geometry of the obstacle (e.g., whether its surfaces or convex or concave.)

An estimator 20 estimates an economic cost for traversing each candidate path or a portion thereof (e.g., candidate path segment) between the starting point and the termination point. The economic cost may be defined in terms of (a) the distance of the candidate path or portion thereof, (b) the anticipated duration of executing the candidate path or a portion thereof, or (c) both the distance and anticipated duration.

The estimator 20 may further comprise a filter for discarding or excluding candidate paths from a search process (e.g., search algorithm) if such candidate path has at least one of a total path cost estimate, a total path duration estimate, and a total path length estimate that exceeds a corresponding path benchmark performance estimate, by more than a maximum threshold, associated with a generally direct linear path between the starting point and the termination point. The benchmark performance estimate may be expressed as a benchmark cost estimate, a benchmark duration estimate, or a benchmark length estimate for the generally direct linear path between the starting point and the termination point.

A search engine 22 selects a preferential path from the identified candidate paths or identified candidate path segments based on the preferential path being associated with a lowest estimated economic cost. For example, the preferential path may be associated with the shortest distance of the candidate paths or the shortest anticipated duration of execution for the candidate paths.

The vehicle controller 24 accepts an input of the path plan (e.g., the preferential path plan) and controls the vehicle consistent with the path plan (e.g., preferential path plan), unless the safeguarding system 36 detects an obstacle, obstruction, hazard, or safety condition that requires the vehicle to depart from the planned path, to stop movement or take evasive measures to avoid a collision with an object or living being.

The vehicle controller 24 may generate control signals for a steering system 30, a braking system 32, and a propulsion system 34 that are consistent with tracking the path plan (e.g., preferential path plan). The control signals may comprise a steering control signal or data message that defines a steering angle of the steering shaft; a braking control signal or data message that defines the amount of deceleration, hydraulic pressure, or braking friction applied to brakes; a propulsion control signal or data message that controls a throttle setting, a fuel flow, or a fuel injection system. Where the propulsion system comprises an electric drive or electric motor, the control signal may comprise electrical energy, electrical current, electrical voltage, vehicular speed or vehicular acceleration.

The steering system 30 may comprise an electrically controlled hydraulic steering system, an electrically driven rack and pinion steering, an Ackerman steering system, or another steering system. The braking system 32 may comprise an electrically controlled hydraulic braking system, or another electrically controlled friction braking system. The propulsion system 34 may comprise an internal combustion engine, an internal combustion engine-electric hybrid system, an electric drive system, or the like.

Figure 2:
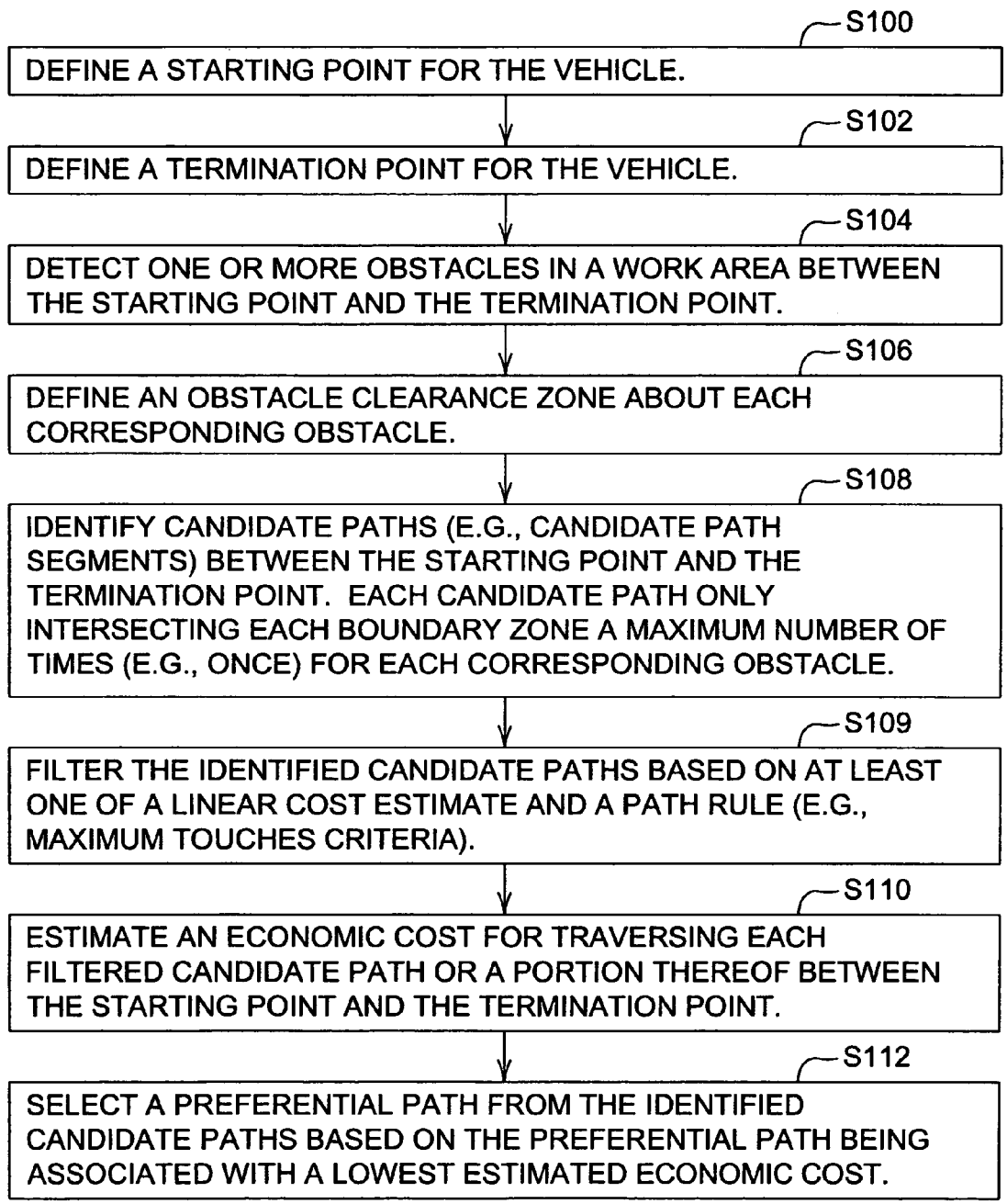
FIG. 2 is one example of a method for planning a path of a vehicle in accordance with the invention.

FIG. 2 is a flow chart of a method for determining a path for a vehicle. The method of FIG. 2 begins in step S100.

In step S100, a location-determining receiver 26 or a path planner 10 define a starting point for the vehicle. For example, the location-determining receiver 26 determines a starting point (e.g., in two dimensional or three dimensional coordinates) and a heading (e.g., referenced to due North, magnetic North or another reference point or bearing) for the vehicle.

In step S102, the definer 12 defines a termination point for the vehicle. For example, the definer 12 defines the termination point (e.g., in two or three dimensional coordinates) and heading for the vehicle.

In step S104, an obstacle detector 14 detects one or more obstacles in a work area between the starting point and the termination point. For example, the obstacle detector may scan a region around the vehicle and estimate the two dimensional and three dimensional locations of points on one or more obstacles in the scanned region. In one embodiment, an obstacle may be modeled as a polygonal region (e.g., a rectangle). In another embodiment, an obstacle may be modeled with a perimeter that represents one or more arcs (e.g., an ellipsoid or a circle) or a combination of one or more arcs and one or more rectilinear sections interconnecting the arcs.

In step S106, an analyzer 18 defines an obstacle clearance zone about each corresponding obstacle. For example, the obstacle clearance zone is spaced apart from the obstacle or object such that the vehicle has a physical clearance to pass unimpeded between the vehicle and the outer physical periphery of the object if the vehicle follows a path that is tangential to or otherwise associated with an outer boundary of the obstacle clearance zone. A planned path segment may intersect the outer boundary of the obstacle clearance zone associated with a vertex or node on the object boundary, for example. A vertex or node is where different path segments are interconnected. The outer boundary may be centered about the obstacle. In one example, the outer boundary comprises an elliptical or circular shape. In another example, the outer boundary comprises a rectangular shape to reduce computational resources. The obstacle may be modeled as elliptical, circular, or rectangular shapes consistent with the outer boundary of the obstacle clearance zone.

In step S108, an analyzer 18 identifies candidate paths (or path segments) between the starting point and the termination point. Each candidate path only intersects each obstacle clearance zone a maximum number of times (e.g., once) for each corresponding obstacle. For example, each candidate path intersects each outer boundary of the obstacle clearance zone once for each obstacle.

Step S108 may be carried out in accordance with various procedures, which may be applied separately or cumulatively. In accordance with a first technique, the identified candidate path comprises a path or path segment from the starting point to the boundary zone about a corresponding obstacle. In accordance with a second technique, the identified candidate path comprises first a path segment from a starting point to a first boundary (of a first obstacle clearance zone) about a first corresponding obstacle, a second path segment from a first boundary to a second boundary (of a second obstacle clearance zone) about a second corresponding obstacle. In accordance with a third technique, the identified candidate path comprises a path from an object boundary to a termination point or a border of the work area. In accordance with a fourth technique, nodes or vertices of the candidate paths are determined by forming tangential interconnections between adjacent object boundaries.

Instep S109, a filter or estimator 20 filters the identified candidate paths based on at least one of a generally linear cost estimate and a path rule (e.g., maximum-touches criteria). For example, the filter or estimator 20 may reduce the search space or eliminate candidate paths or path segments from consideration that (1) are not drivable by the vehicle (e.g., require orthogonal turns where the vehicle has Ackerman steering), (2) strike or collide with one or more obstacles in the work area, (3) exceed a maximum path length or a maximum threshold cost limit (e.g., in relation to other proposed or tentative candidate paths or solutions for the preferential path), or (4) touch an obstacle or outer boundary of the work area more than a threshold maximum number of times. However, a single "touch" or "touching" of an obstacle is defined herein as (a) the vehicle's coming into contact with an outer boundary of the obstacle clearance zone associated with a corresponding obstacle, (b) the vehicle's traveling or not traveling along the outer boundary of the obstacle clearance zone, and (c) the vehicle's departing from the outer boundary after the occurrence of (a) or (b) above. Candidate paths are not drivable where the radius of an arc in the candidate path segment is greater than the minimum turning radius of the vehicle.

Under a linear cost estimation technique, the estimator 20 estimates the cost to complete a partial path from the starting point. For example, a straight-line path cost estimate from the starting point of the path to the termination point, ignoring obstacles may provide a benchmark linear cost estimate (e.g., an ideal cost estimate) for comparison against realistic candidate paths given obstacles. The foregoing benchmark cost estimate tends to underestimate the true cost to complete since it ignores turning radius constraints and the possible interference of obstacles. However, if a candidate path exceeds the benchmark linear cost estimate by more than a maximum amount, the candidate path may be summarily rejected to prune the solution space and conserve computational resources of the path planner 10. The identified candidate paths are filtered based on a benchmark performance estimate of a generally direct linear path between the starting point and the termination point.

In one embodiment, the linear cost estimate technique may be carried out in accordance with the following procedure: The filter or estimator 20 filters the identified candidate paths to exclude at least a rejected portion of the identified candidate paths from a search process if such rejected candidate path has at least one of a total path cost estimate, a total path duration estimate, and a total path length estimate that exceeds a corresponding path benchmark estimate, by more than a maximum threshold, associated with a generally direct linear path between the starting point and the termination point.

Under the application of path rules, the filter or estimator 20 reduces or eliminates unnecessary looping of the candidate path or candidate path segment through the obstacles. For example, the path rule may set a limit on the number of times that a candidate path may intercept an obstacle clearance zone. Such a limitation on the number of times that a candidate path may intercept an obstacle clearance zone may be referred to as a maximum-touches criteria. A under one example of a maximum-touches criteria a path rule relates to contacting an outer boundary associated with an obstacle clearance about an obstacle less than or equal to an allotted maximum number of times.

Consider a convex obstacle that lies between the starting point and the termination point. Here, the maximum number of touches of the outer boundary of the obstacle clearance zone is set to one for the maximum-touches filter. Therefore, each valid candidate path segment or path is permitted to touch (arrive, follow the shape border, then depart) once during the candidate path construction or search for the preferential path. Any candidate path segment or partial solution that touches this outer boundary of the obstacle avoid zone (e.g., for a convex obstacle) more than the maximum number of touches (e.g., once, for a convex obstacle or more times for an obstacle with concavities) will be considered invalid or non-optimal and can be discarded from consideration by the search process. In general, the maximum allowed touches may be determined as one plus the number of concavities of the shape.

However, the path formation rule on the maximum number of touches is different for the outside border shape than for a convex obstacle in the work area. Here, the maximum number of touches allowed is simply the number of concavities of the outside border shape associated with the work area. In sum, candidate paths, path segments or the partial solution that exceed the maximum number of permitted touches for an outside border shape, a boundary clearance zone, or an obstacle clearance zone is discarded prior to or during the search process. This filtering process is particularly effective when there are many obstacles in a work area because it forces the search process to expand paths that make progress towards the goal of reaching the termination point, rather than somewhat aimlessly looping among obstacles or following a circuitous route.

In sum, the estimator 20 or filter may filter the identified candidate paths based on one or more of the following: (1) a benchmark performance estimate of a generally direct linear path between the starting point (e.g., in accordance with the linear cost estimate technique) and the termination point, and (2) a maximum-touches criteria, where the maximum touches criteria refers to contacting an outer boundary associated with an obstacle clearance about an obstacle less than or equal to an allotted maximum number of times.

In step S110, an estimator 20 estimates an economic cost for traversing each candidate path or a portion thereof (e.g., a path segment) between the starting point and the termination point. The economic cost may be defined in terms of the distance of the candidate path or portion thereof, the anticipated duration of executing the candidate path or a portion thereof, or both.

In step S112, a path planner 10 or search engine 22 selects a preferential path from the identified candidate paths based on the preferential path being associated with a lowest estimated economic cost (e.g., a total cost of the candidate path and its constituent candidate path segments in the aggregate). For example, the preferential path may be associated with the shortest distance of the candidate paths or the shortest anticipated duration of execution for the candidate paths to travel from the starting point to the termination point. In addition to being the lowest estimated cost, the preferential path must satisfy one or more of the following supplemental criteria: (1) the preferential path must be drivable by the vehicle given its vehicular constraints (e.g., minimum turning radius); (2) the preferential path must avoid striking or colliding with objects and obstacles in the work area; and (3) the preferential path must avoid striking, contacting or injuring persons and animals in the work area.

The selection of step S112 may be executed in accordance with various procedures, which may be applied alternately or cumulatively. Under a first procedure, the path planner 10 or search engine 22 searches the candidate paths or portions of candidate paths in accordance with the A* search algorithm to determine the preferential path plan. Under a second procedure, the path planner 10 or search engine 22 searches the candidate paths or portions of candidate paths in accordance with the bounded A* search algorithm. Under a third procedure, the path planner 10 or search engine 22 searches the candidate paths or portions of candidate paths in accordance with another search algorithm to determine the preferential path plan.

Under the first procedure, a path planner 10 determines the preferential path plan from the candidate path plan based on the economic costs of the candidate path plans (e.g., each candidate path plan or a reasonable subset thereof) in accordance with an A* search algorithm. The economic costs may include the distances or energy consumption for one or more of the following vehicular movements: a vehicle traveling from a vehicular starting point to a first obstacle or obstacle clearance zone of a work area, the vehicle traveling from one obstacle to another obstacle, the vehicle traveling from one obstacle to a last obstacle, and the vehicle traveling from the last obstacle to a termination point. An economic cost may be estimated for each permutation or combination of obstacle orders, candidate path plan segments between pairs of obstacles, and possible aggregate candidate path plans. A search algorithm may be used to search among candidate path plans (or segments thereof) for a preferential path plan. Although a prodigious assortment of search algorithms may be used, the A* search algorithm and the Bounded A* search algorithm are two illustrative examples of search algorithms for finding a preferential path plan for the work vehicle to cover a designated portion of the work area.

The A* search algorithm and the Bounded A* search algorithm both use the following notation, constants, and functions:

S denotes a solution (either empty, partial or complete). A solution represents a path plan. A complete solution represents a preferential path plan. A partial solution represents an estimate or candidate path plan, which may or may not represent a preferential path plan.

W is a constant, a large negative number (such as −10, 000). The user may define the threshold minimum number.

Depth(S) is the depth of the solution S (the count of the number of expansions it has had). An expansion is a potential solution or candidate path plan. The expansion may have child candidate path segments that are dependent on a parent candidate path plan, for instance.

Q denotes a priority queue with priority function Score(S), where S is an item on the Queue.

Pop(Q) returns the lowest scoring item on the queue or data stack. The queue or data stack may represent a series of registers of data storage, magnetic data storage, optical data storage, memory, volatile computer memory or the like.

Push(Q, S) pushes S onto the queue Q or data stack.

Domain dependent functions:

G(S) the cost of the partial solution so far;

H(S) the estimated cost to complete the partial solution;

F(S) is simply G(S)+H(S), a lower bound on the final cost of S;

Expand(S) returns a list of new children solutions created by expanding the partial solution S;

Complete?(S) returns true when S is a complete solution; false otherwise.

In accordance with a first procedure for executing step S112, the A* Algorithm may be used to search for an optimal or preferential path plan solution to the obstacle graph in accordance with the following software instructions.

```
Let Score(S) = F(S)
Let S be the empty solution, push(Q, S)
Let best_solution = false
    While Not(best_solution)
        S = pop(Q)
            If Complete?(S) then
                best = S
            Else For all s Î Expand(S)
                Do Push(Q,s)
Finally Return best
```

The following components of the A* algorithm may be used to execute the searching process of step S112:

The initial solution: This consists of an empty path beginning at the starting configuration.

The cost of a solution so far: is the sum of the individual costs of the edges (paths) in the solution so far.

The solution expansion function: that takes a solution and returns a set of children solutions. Consider a partial solution that arrived at shape Z going counter-clockwise. Then this solution can be expanded to follow the border of shape Z counter-clockwise then leave shape Z at a tangent to arrive at all shapes in either direction where a clear direct path exists.

The estimated cost to complete: this function returns a lower bound on the cost to complete the solution. The more accurate this lower-bound, the better performance the search engine, in that better quality solutions will be found sooner and less memory will be consumed. A heuristic technique may be used to estimate this lower bound.

The above A* algorithm does not generally employ a bound to limit the computational iterations of possible candidate path plans and attendant computational resources. The first solution A* finds will be optimal so long as the H function never overestimates the true cost to complete the solution. Such an H function is called an admissible heuristic because it may be used to decide which solutions are considered complete and which are not. In one embodiment, after a visibility graph has been constructed that includes various candidate paths or candidate path segments, the above search may be performed with the A* algorithm to find a preferential path or minimum cost path from starting point to the termination point.

Under a second procedure, which is an alternate to the A* algorithm, the Bounded-A* algorithm is used to perform the search through the candidate path plans to identify a preferential path plan. The Bounded A* algorithm winnows through candidate path plans to identify the solution to the preferential path plan. Searching is a powerful method for solving the classes of problems whose solutions cannot be directly calculated. The search methodology solves these problems by first representing a large space of possible solutions, then performing a search through this space starting at an empty solution and terminating at a complete and near-optimal solution. To clearly define this search process, it is necessary to define the components of the A* algorithm:

1) The initial solution: one of the obstacles that border the outside shape may facilitate determination of the initial solution or a candidate path plan.

2) The cost of a solution: so far can be estimated by summing the costs of each of the edges employed between the obstacles. There is no need to include the actual cost of traversing (e.g., mowing) each obstacle since all solutions will include all obstacles.

3) The solution expansion function: takes a solution and returns a set of children solutions. Considering a partial solution whose last obstacle traversed (e.g., mowed) is j, which obstacles could the solution be expanded to? The answer depends upon which side of obstacle j the solution arrived at and the parity of j. Say the solution arrived at the first side of j on Shape A; then, if the parity of the obstacle is even, the vehicle will finish obstacle j on the border of ShapeA. Hence, all untraversed (e.g., unmowed) obstacles that have a side on ShapeA are candidates for expansion. Alternatively, if the parity of the obstacle is odd, then the vehicle will finish obstacle j on the second side (say on ShapeZ), and all untraversed (e.g., unmowed) obstacles that have a side on ShapeZ will be candidates for expansion.

The Bounded A* algorithm is a hybrid of the A* algorithm and the Branch and Bound algorithm, where solutions are expanded in a depth-first, best-first way, and a bound is used to terminate unneeded partial solutions. In this case, the best-so-far bound is compared to the F function value of each partial solution. Using the F value, rather than the G value, provides a tighter and therefore more effective bound. The Bounded A* algorithm may be expressed as follows, consistent with the earlier definitions of terms presented in conjunction with FIG. 9.

```
Let Score(S) = F(S) + W *Depth(S)
Let S be the empty solution, push(Q, S)
Let bound = ¥
    While Not(Empty?(Q))
S = Pop(Q)
    If Complete?(S) then
        If F(S) < bound then
            bound = F(S),
            best_so_far = S
        Else If F(S) < bound then
            For all s Î Expand(S)
                Do If F(s) < bound then
                    push(Q, s)
            Finally Return best_so_far.
```

The Bounded A* Algorithm does a depth-first search and thereby saves memory. The Bounded A* Algorithm uses its heuristic function F(s) to direct the search to focus on the most promising solutions during the forward search process. In addition, the heuristic function F(s) is used as a lower bound on s to terminate it early, if its value can never be better than the best-so-far solution.

Bounded A* combines techniques from both depth-first Branch-and-Bound and A* to produce an algorithm that: (a) Finds a reasonable solution quickly, (b) incrementally improves the solution given more Central Processing Unit (CPU) time of the path planner 10 or other data processor, (c) uses only memory bounded linearly in the solution depth, and (d) enables control knowledge to be incorporated into the search process. Branch-and-bound is a classic approach developed by the operations research community for solving discrete combinatorial optimization problems. The advantages of depth-first branch-and-bound are that a solution is often found quickly, and memory requirements are minimized. However, the optimal solution is only found following an exhaustive search. Another method developed from the Artificial Intelligence community is A*. The advantage of A* is that the optimal solution is found first, and control knowledge can be incorporated into the algorithm to speed the progress. However, A* can require an exponential amount of memory, and may not produce a solution within a reasonable time limit. A hybrid method, referred to as Bounded-A*, captures desirable attributes of both the A*algorithm and the Bounded A* algorithm.

Figure 3:
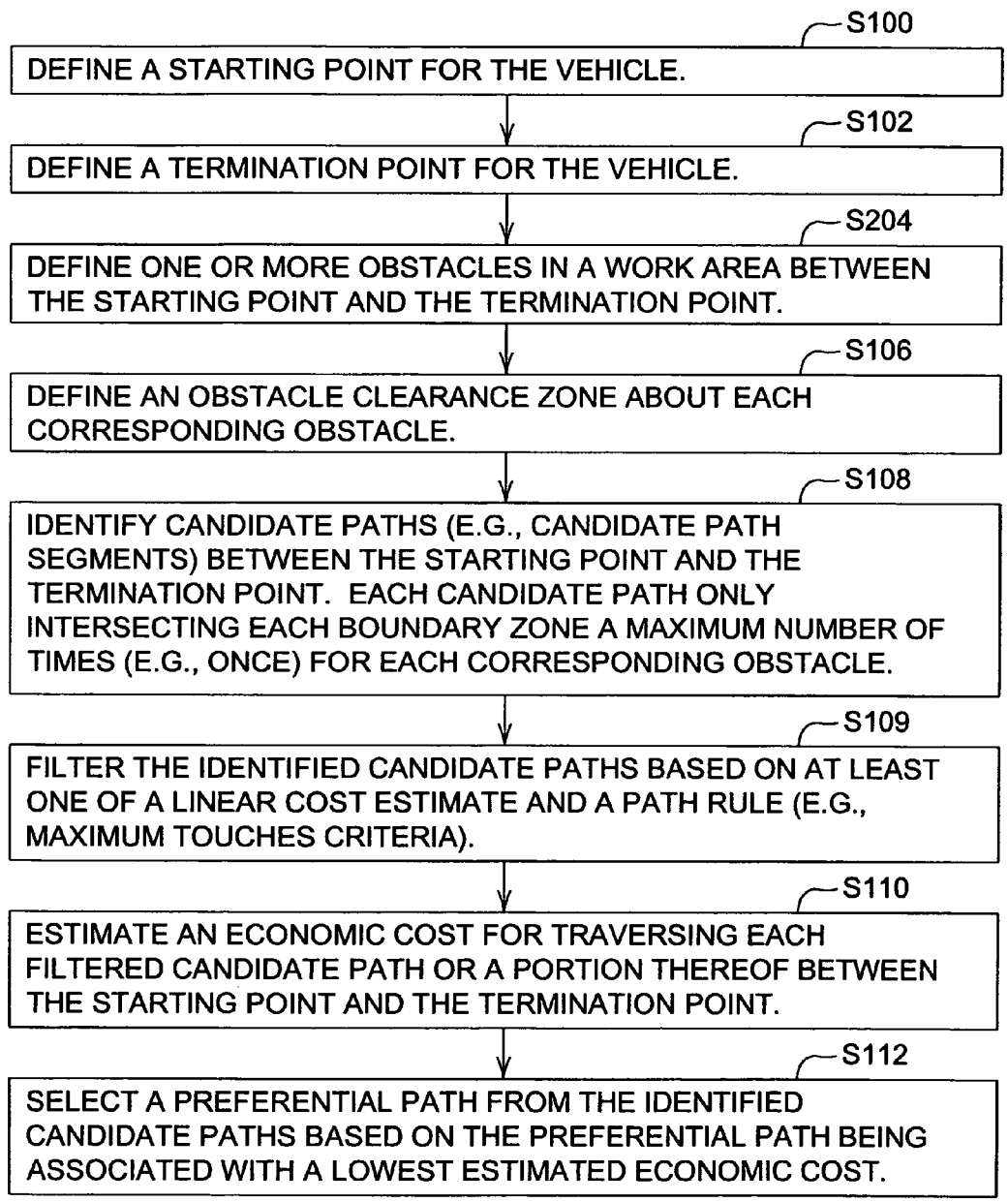
FIG. 3 is another example of a method for planning a path of a vehicle in accordance with the invention.

The method of FIG. 3 is similar to the method of FIG. 2, except step S104 is replaced with step S204. Like reference numbers indicate like steps or procedures in FIG. 2 and FIG. 3.

In step S204, one or more obstacles are defined in a work area between the starting point and the termination point. For example, a user may observe and enter the locations (e.g., two or three dimensional coordinates), dimensions (e.g., maximum height, length and width) or other specifications of the obstacles in the work area via the user interface 28. The user or another may use measurement equipment (e.g., location determining receivers), surveying equipment, or other equipment to determine the locations of at least obstacles that are relevant to potential paths between the starting point and termination point in the work area.

Figure 4:
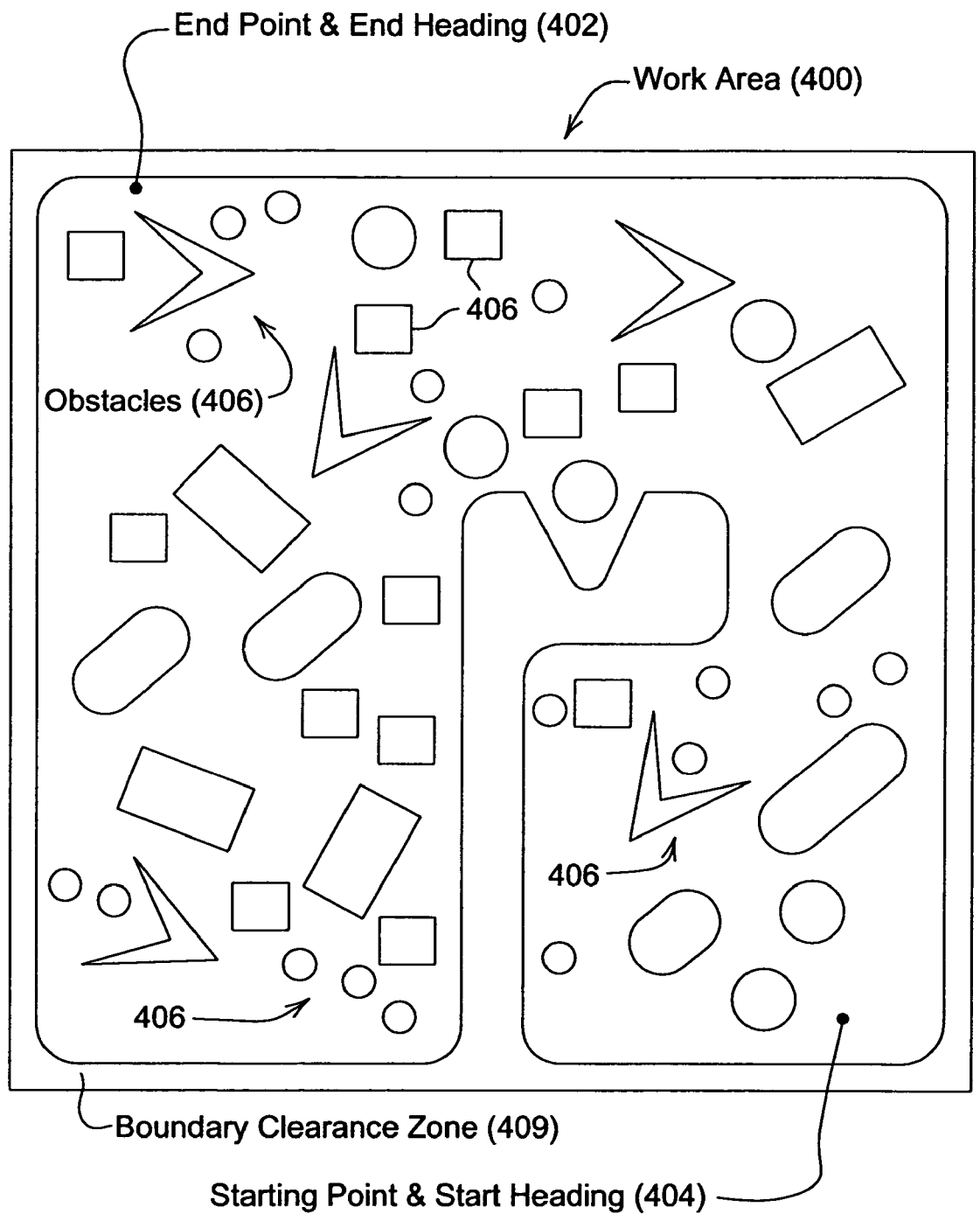
FIG. 4 is a plan view of an illustrative work area with various obstacles.

FIG. 4 is a representation of a work area 400 with various obstacles 406. A starting point 404 and starting heading is defined. A termination point 402 and termination heading is also defined. FIG. 4 depicts an illustrative graphical representation of the defined starting point 404 in step S100 of FIG. 2 and the defined termination point 402 in step S102 of FIG. 2, for example.

Although the obstacles 406 and work area 400 boundaries of FIG. 4 might be presented as measured or sensed by a vehicle, the obstacles 406 and work area 400 boundaries may be modeled and expanded as described in this paragraph. The actual obstacles 406 and outside border of the work area 400 may be pre-processed to consider the safety distance and minimum turning radius of the vehicle. For purposes of modeling the obstacles 406 and the work area for point-to-point path planning or navigation by a vehicle, the real world map boundary is modeled as reduced in size (e.g. by the boundary clearance zone 409) and the obstacles 406 are modeled as increased in size (e.g., by each respective obstacle clearance zone) such that the vehicle is capable of one or more of the following: (1) following the revised boundaries of the work area 400 without leaving the work area or striking or contacting any obstacles around the edge of the work area; (2) traveling through the work area 400 while maintaining a desired minimum clearance (e.g., obstacle clearance zone) between the vehicle and an obstacle; (3) traveling through the work area without striking or colliding with any stationary or moving obstacles; (4) traveling along an outer boundary of an obstacle clearance zone about an obstacle or in free space within the work area; and (5) traveling from one outer boundary of one obstacle to a next outer boundary of a next obstacle to traverse through an obstacle cluttered environment within the work area.

Figure 5:
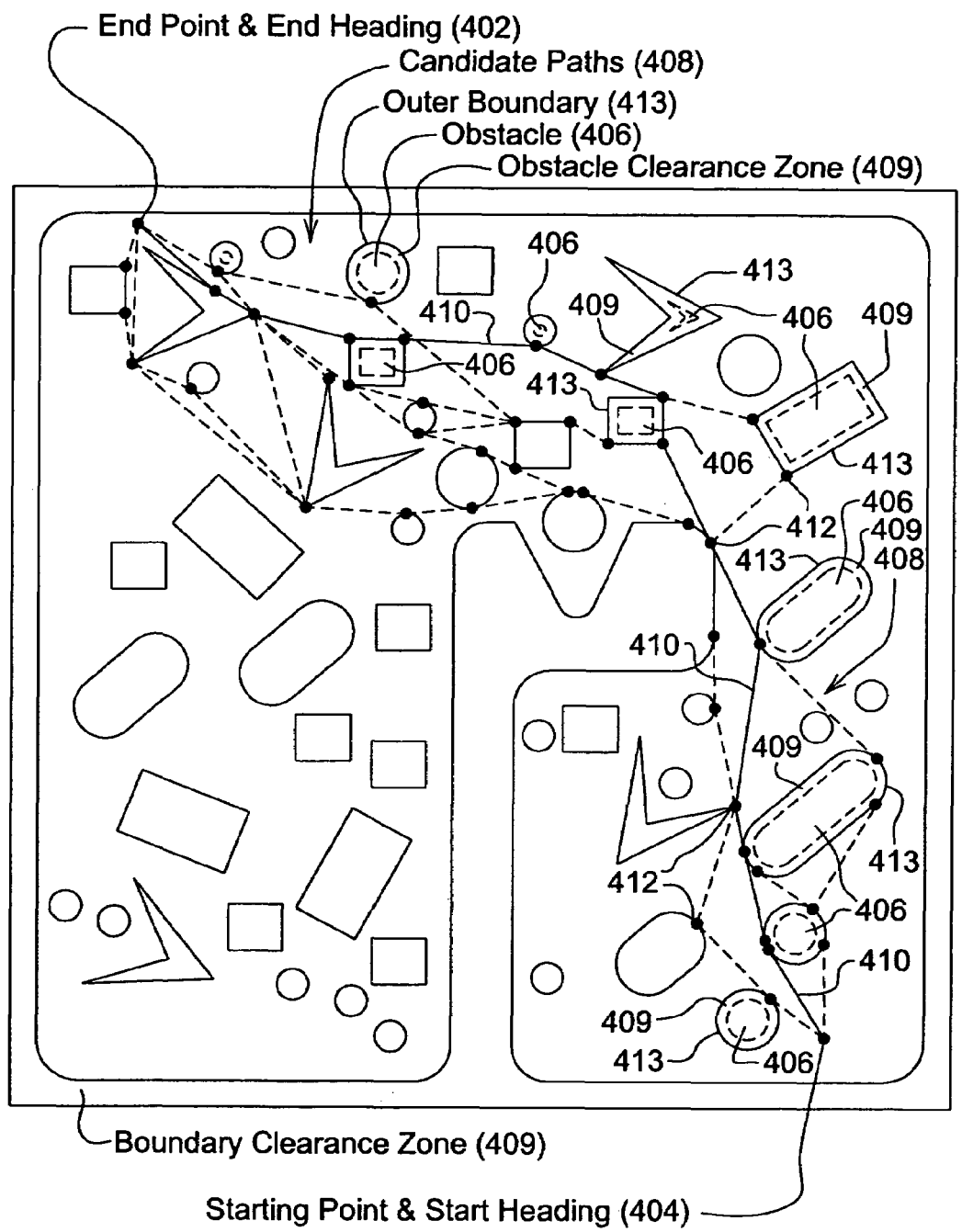
FIG. 5 is a plan view of the illustrative work area of FIG. 4 illustrating candidate path segments.

FIG. 5 is a representation of the work area 400 of FIG. 4 which includes a group of candidate path plans (or candidate path segments) between the starting point 404 and the termination point 402. FIG. 5 depicts an illustrative graphical representation of the identified candidate paths 408 of step S108, for example.

A path planning problem is usually solved by first constructing what is known as a visibility graph, as shown in FIG. 5, which is then searched using the A* algorithm to find the shortest (or cheapest) path from the starting point or starting confirmation to the termination point or the end configuration. The visibility graph of FIG. 5 consists of segments (e.g., curved segments, linear segments or edges) and nodes 412 where the edges represent direct drivable paths through free space (i.e. not crossing any of the obstacles 406 or going outside the border) and nodes 412 represent choice points where paths merge and split. There are five kinds of paths (edges) in this graph: (a) paths from the starting point to the termination point or paths from the starting configuration to the end configuration; (b) paths from the starting point or start configuration to the borders, outer boundary of obstacle clearance zone (e.g., obstacles 406); (c) paths from the borders or outer boundary of any of the shapes or obstacle clearance zone to the end configuration or termination point; (d) paths around the shapes (e.g., coextensive with or traveling along an outer boundary of the obstacle clearance zone); and (e) paths leaving a shape arriving at a shape (possibly the same shape). Each obstacle 406 is associated with an obstacle clearance zone 409 about the obstacle to provide sufficient clearance for a vehicle to navigate or drive along an outer boundary 413 of the obstacle clearance zone 409 without contacting or colliding with the corresponding obstacle 406. The dimensions of the obstacle clearance zone 409 may depend upon the dimensions of the vehicle, vehicular width, turning radius, and the dimensions of the obstacle, for example.

Figure 6:
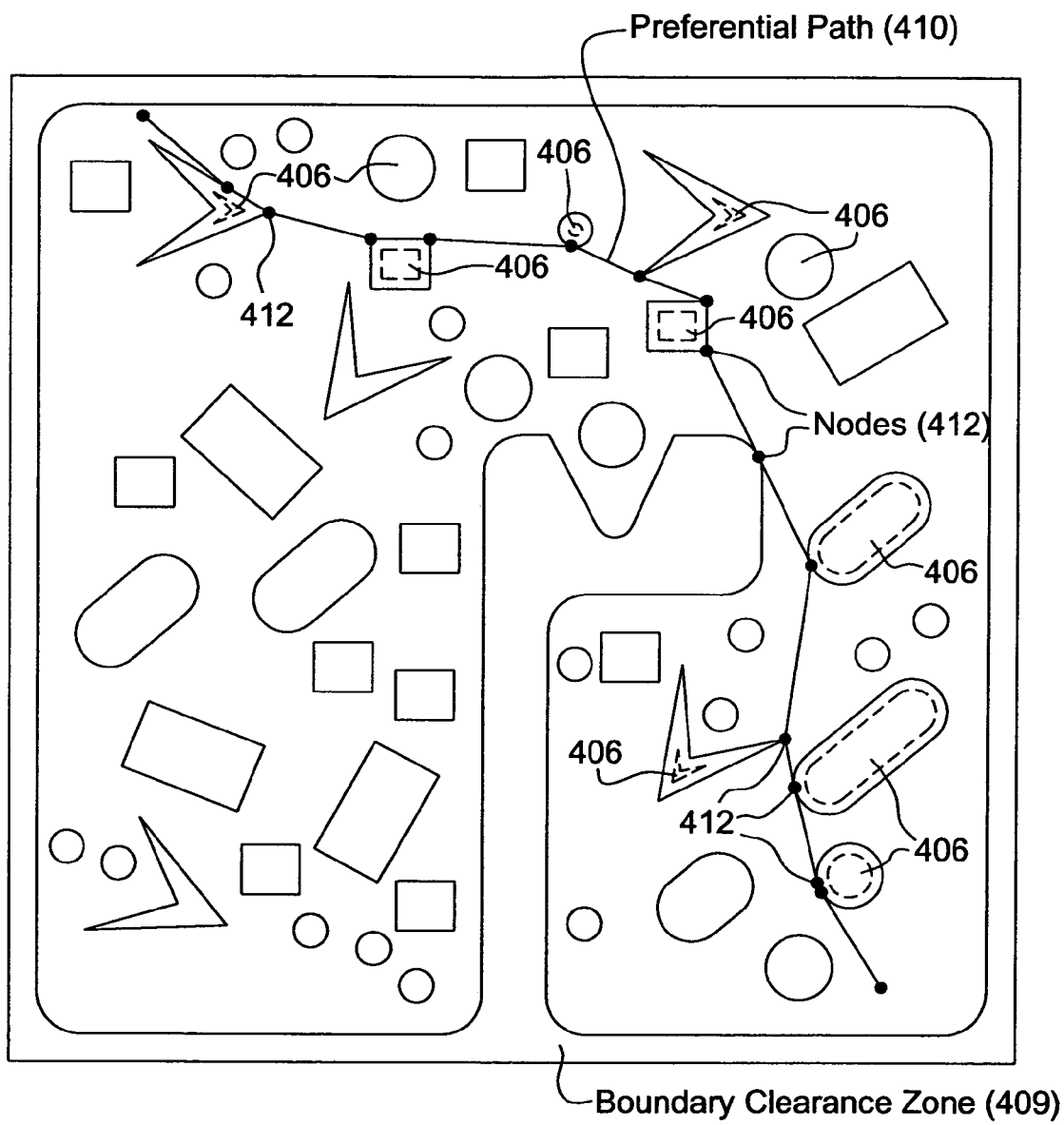
FIG. 6 is a plan view of the illustrative work area of FIG. 5 illustrating a preferential path plan.

FIG. 6 is a representation of a work area 400 which shows an illustrative preferential path 410 plan between a starting point 404 and a termination point 402. The preferential path 410 plan of FIG. 6 is selected from the candidate path plans depicted in FIG. 5. FIG. 6 shows an illustrative graphical representation of the outcome of the selection process in step S112 of FIG. 2, for example.

Figure 7:
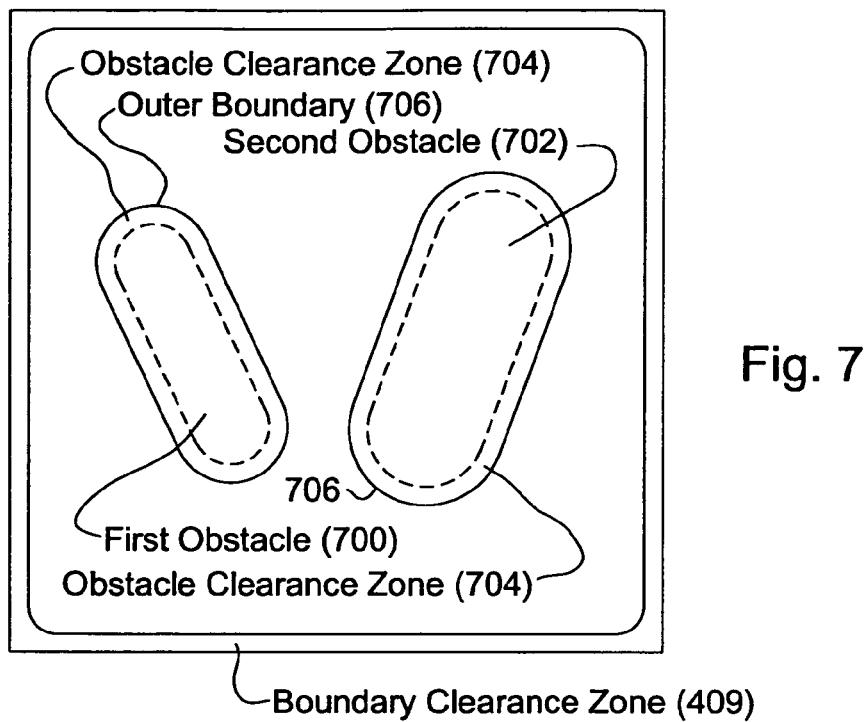
FIG. 7 shows two illustrative obstacles which may lie in an illustrative or actual path plan.

FIG. 7 shows a work area 409 that contains illustrative obstacles (e.g., a first obstacle 700 and a second obstacle 702). The work area 409 is bounded by a boundary clearance zone 409. The boundary clearance zone may establish a boundary for a path of the vehicle so that the vehicle remains in the work area 409 and does not interfere with (e.g., strike or collide with) any hazards, objects or obstacles on the edge of the work area 409. Each obstacle shown in FIG. 7 has an obstacle shape or physical shape that is indicated by a dashed line. Although the obstacle shape includes a generally semicircular ends associated with a rectangular central region, the obstacle shape may have any geometric or other shape in practice. An obstacle clearance zone 704 surrounds the corresponding obstacle shape of the first obstacle 700 and has an outer boundary 706. Similarly, an obstacle clearance zone 704 surrounds the corresponding obstacle shape of the second obstacle 702 and has an outer boundary 706. In general, the obstacle clearance zone 704 tracks the obstacle shape. For example, the outer boundary 706 of the obstacle clearance zone 704 may represent a scaled or expanded version (e.g., uniformly or isotropically) of the physical boundary of the obstacle.

Figure 8:
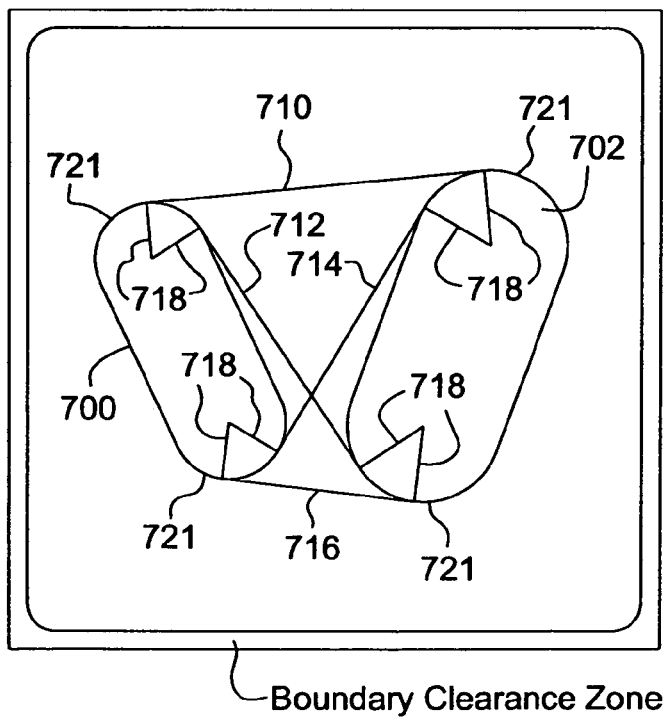
FIG. 8 shows candidate path segments of paths around or between the obstacles.

FIG. 8 shows the generation of various candidate paths between two obstacles (700, 702) of FIG. 7. It should be recognized that the candidate paths in FIG. 8 are between two obstacles (700, 702), rather than a starting point and a termination point. Accordingly, the candidate paths of FIG. 8 may represent a portion or segment of a candidate path or preferential path of FIG. 2. The preferential path segment of FIG. 8 between the obstacles (700, 702) may depend upon the starting point and termination point, however, as part of an economically efficient global path plan.

If the turning radius of the vehicle is greater than zero and that the shapes of outer boundary 706 of the obstacle clearance zones 704 around the obstacles represent drivable paths around the actual obstacles, then the direct paths between shapes will be generally straight lines that leave and arrive at tangents to the obstacle clearance zones 704 on outer boundary 706 of the obstacle clearance zone 704. Where the shapes of the obstacle clearance zones 704 are represented straight lines and arcs of circles (where the radius of each arc is greater than or equal to the minimum physical radius of the obstacle), the possible direct paths (e.g., 710, 712, 714 and 716) between the two obstacles (700, 702) generally leave and arrive at the arc-segments 721 of the shapes.

The path planner 10 may consider the arcs 721 of the first obstacle 700 and the arcs of the second obstacle 702. For each arc pair between the first obstacle 700 and the second obstacle 702, depart and arrive travel directions may be also considered to track each candidate path segment. Given two arcs 721 and their corresponding arrival and departure directions, the vectors 718 from the arc centers to the required tangent points on the arcs 721 is computed using trigonometry or otherwise. The end points of each candidate path (710, 712, 714, and 716) may be represented by the pairs of vectors (or coordinates associated therewith). To construct the visibility graph of FIG. 8, the candidate path formation process is repeated for all possible pairs of shapes, including the outside border shape or boundary clearance zone 409. For each possible tangent path or candidate path computed, a check is made to ensure that it does not cross through any obstacle 700 or 702. Only clear paths that do not intercept any obstacle are added to the visibility graph of candidate paths.

In FIG. 8, four candidate path plan segments (710, 712, 714 and 716) are shown and are individually referred to as a first path candidate segment 710, a second path candidate segment 712, a third path candidate segment 714 and a fourth path candidate segment 716. Each path plan segment tangentially contacts the outer boundary 706 of the obstacle clearance zone 704 of the first obstacle 700 and the second obstacle 702 a maximum number of times. As shown, each path segment tangentially contacts the outer boundary 706 of the first obstacle 700 once and the outer boundary 706 of the second obstacle 702 once to provide a path between the first obstacle 700 and second obstacle 702. Although the tangential contact with the outer boundary 706 may occur at the arc portions 721 of the obstacles as shown, in other embodiments, the candidate path segments or tangent path segments may contact other portions of the obstacles or objects.

The validity of each candidate path segment may be confirmed by determining a radial test segment that intersects both with the outer boundary 706 of the obstacle clearance zone 704 and the candidate path.

The radial test segment 718 may extend from a geometric center point of the object or a divisible portion thereof. As shown in FIG. 8, the obstacles are divisible into two semicircular portions interconnected by a rectangular region. The candidate path segments intersect with the obstacle clearance zones 704 associated with the two or more semicircular portions of the obstacles. A center point of each semicircular portion forms one end point of the radial test segment 718. The other end point of the radial test segment 718 may be the outer boundary 706 of the obstacle clearance zone 704 or the outer periphery of the object. The radial test segment 718 is associated with a radial clearance between the obstacle and the outer boundary 706 of the obstacle. For the candidate path to be acceptable or valid, the candidate path must have meet or exceed a minimum radial clearance for the vehicle with respect to the first obstacle 700 and the second obstacle 702. If the candidate path meets or exceeds the minimum radial clearance (e.g., which may be based on vehicular constraints), the candidate path may be regarded as a validated candidate path. If the candidate path does not meet the minimum radial clearance, the path is rejected as a candidate path and as a preferential path. Alternatively, the rejected candidate path may be redefined to meet the minimal radial clearance requirement.

The approach outlined here for computing optimal point to point paths in cluttered environments is straightforward to implement and generally applicable. Dynamically creating the portions of the visibility graph that are needed and using linear cost estimation and path rules to focus and prune the search produces an effective and efficient algorithm that can rapidly solve complex point-to-point problems.

Having described the preferred embodiment, it will become apparent that various modifications can be made without departing from the scope of the invention as defined in the accompanying claims.

The following is claimed:

1. A method for determining a path for a vehicle, the method comprising:
   defining a starting point for the vehicle;
   defining a termination point for the vehicle;
   detecting two or more obstacles in a work area between the starting point and the termination point;
   defining an obstacle clearance zone about each corresponding obstacle;
   identifying candidate paths between the starting point and the termination point, each candidate path only intersecting each obstacle clearance zone a maximum number of times for each corresponding obstacle;
   estimating an economic cost for traversing each candidate path or a portion thereof between the starting point and the termination point; and
   selecting a preferential path from the identified candidate paths based on the preferential path being associated with a lowest estimated economic cost.

2. The method according to claim 1, wherein the defining of the starting point of the vehicle comprises defining the starting point and heading of the vehicle; and wherein the defining the termination point comprises defining the termination point and heading for the vehicle.

3. The method according to claim 1, wherein the identified candidate path comprises a path from the starting point to the termination point.

4. The method according to claim 1 wherein the identified candidate path comprises a path from the starting point to an outer boundary of the obstacle clearance zone about a corresponding obstacle.

5. The method according to claim 4 wherein the identified candidate path comprises a path segment that is coextensive with a portion of the outer boundary of the obstacle clearance zone.

6. The method according to claim 1 wherein the identified candidate path comprises first a path segment from the starting point to a first obstacle clearance zone about a first corresponding obstacle and a second path segment interconnected to the first path segment, the second path extending from the first obstacle clearance zone to a second obstacle clearance zone about a second corresponding obstacle.

7. The method according to claim 1 wherein the identified candidate path comprises a path segment from a first outer boundary associated with an obstacle clearance zone of a first obstacle to a second outer boundary associated with an obstacle clearance zone of a second obstacle.

8. The method according to claim 7 wherein nodes or vertices of the candidate paths are determined by forming tangential interconnections with respect to the first outer boundary and the second outer boundary.

9. The method according to claim 1 wherein the selecting comprises searching of the candidate paths or portions of candidate paths in accordance with at least one of the A* search algorithm and the bounded A* search algorithm.

10. The method according to claim 1 wherein the selecting comprises searching of the candidate paths or portions of candidate paths after first discarding candidate paths or path segments that exceed a maximum number of permitted touches with respect to at least one of the obstacle clearance zone, an outer boundary of an obstacle clearance zone, a boundary clearance zone, and an outside border shape of a work area.

11. The method according to claim 1 wherein an outer boundary of an obstacle is spaced apart from the obstacle such that the vehicle has a physical clearance between the vehicle and the obstacle if the vehicle follows a path segment that is coextensive with the outer boundary.

12. The method according to claim 1 wherein an outer boundary of the obstacle clearance zone comprises a generally elliptical or generally circular shape.

13. The method according to claim 1 wherein an outer boundary of the obstacle clearance zone comprises a generally rectangular shape to reduce computational resources.

14. The method according to claim 1 wherein the maximum number of times is one for a generally convex obstacle.

15. The method according to claim 1 wherein the maximum number of times is one plus the number of material concavities associated with an obstacle.

16. The method according to claim 1 further comprising:
   filtering the identified candidate paths based on at least one of a benchmark performance estimate of a generally direct linear path between the starting point and the termination point and a maximum-touches criteria, where the maximum touches criteria refers to contacting an outer boundary associated with an obstacle clearance about an obstacle less than or equal to an allotted maximum number of times.

17. The path planner according to claim 1 further comprising:
   filtering the identified candidate paths to exclude at least a rejected portion of the identified candidate paths from a search process if the rejected portion has at least one of a total path cost estimate, a total path duration estimate, and a total path length estimate that exceeds a corresponding path benchmark estimate, by more than a maximum threshold, associated with a generally direct linear path between the starting point and the termination point.

18. A path planner for determining a path for a vehicle, the path planner comprising:
   a location determining receiver for defining a starting point for the vehicle;
   a definer for defining a termination point for the vehicle;
   an obstacle detector for detecting two or more obstacles in a work area between the starting point and the termination point;
   an obstacle modeler for defining an obstacle clearance zone about each corresponding obstacle;
   an analyzer for identifying candidate paths between the starting point and the termination point, each candidate path only intersecting each obstacle clearance zone once for each corresponding obstacle;
   an estimator for estimating an economic cost for traversing each candidate path or a portion thereof between the starting point and the termination point; and
   a search engine for selecting a preferential path from the identified candidate paths based on the preferential path being associated with a lowest estimated economic cost.

19. The path planner according to claim 18, wherein the location determining receiver determines the starting point and corresponding starting heading of the vehicle; and wherein the definer defines the termination point and corresponding termination heading for the vehicle.

20. The path planner according to claim 18, wherein the analyzer identifies a candidate path comprising a path portion from the starting point to the termination point.

21. The path planner according to claim 18 wherein the analyzer identifies the candidate path comprising a path portion from the starting point to an outer boundary of the obstacle clearance zone about a corresponding obstacle.

22. The path planner according to claim 18 wherein the analyzer identifies a candidate path portion comprising a first path segment from the starting point to a first obstacle clearance zone about a first corresponding obstacle and a second path segment interconnected to the first path segment, the second path segment extending from the first obstacle clearance zone to a second obstacle clearance zone about a second corresponding obstacle.

23. The path planner according to claim 18 wherein the analyzer identifies a candidate path portion comprising a path segment from a first outer boundary associated with an obstacle clearance zone of a first obstacle to a second outer boundary associated with an obstacle clearance zone of a second obstacle.

24. The path planner according to claim 23 wherein the analyzer determines nodes or vertices of the candidate paths by forming tangential interconnections with respect to the first outer boundary and the second outer boundary.

25. The path planner according to claim 18 wherein the search engine is adapted to search the candidate paths or portions of the candidate paths in accordance with at least one of an A* search algorithm and a bounded A* search algorithm.

26. The path planner according to claim 18 further comprising a filter for discarding or excluding the candidate paths from a search process if any of the candidate paths exceeds a maximum number of permitted touches for at least one of an outer boundary, a boundary clearance zone, the obstacle clearance zone, and an outside border shape of a work area.

27. The path planner according to claim 18 further comprising a filter for discarding or excluding the candidate paths from a search process if any of the candidate paths has at least one of a total path cost estimate, a total path duration estimate, and a total path length estimate that exceeds a corresponding path benchmark estimate, by more than a maximum threshold, associated with a generally direct linear path between the starting point and the termination point.

28. The path planner according to claim 18 wherein the obstacle modeler models the obstacle clearance zone such that an outer boundary of the obstacle clearance zone is spaced apart from the obstacle to provide a physical clearance between the vehicle and the obstacle if the vehicle follows a path associated with a vertex or node on an outer boundary of the obstacle clearance zone.

29. The path planner according to claim 18 wherein the obstacle modeler models an outer boundary associated with an obstacle as at least one of a generally elliptical, generally circular, and generally rectangular.

* * * * *